United States Patent
Khorram

(10) Patent No.: US 7,130,607 B2
(45) Date of Patent: *Oct. 31, 2006

(54) ADJUSTING A PROGRAMMABLE MIXER

(75) Inventor: Shahla Khorram, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/928,061

(22) Filed: Aug. 28, 2004

(65) Prior Publication Data

US 2005/0037723 A1  Feb. 17, 2005

Related U.S. Application Data

(63) Continuation of application No. 10/077,571, filed on Feb. 15, 2002, now Pat. No. 6,801,761.

(51) Int. Cl.
*H04B 1/26* (2006.01)

(52) U.S. Cl. .................. 455/326; 455/319; 455/293; 327/116

(58) Field of Classification Search ............. 455/315, 455/318, 323, 326, 314, 324, 319, 280, 283, 455/284, 293; 327/113, 116, 355
See application file for complete search history.

(56) References Cited

U.S. PATENT DOCUMENTS

| 6,032,028 | A * | 2/2000 | Dickey et al. ............. 455/110 |
| 6,192,225 | B1 * | 2/2001 | Arpaia et al. ............ 455/196.1 |
| 6,535,725 | B1 * | 3/2003 | Hatcher et al. ............ 455/317 |
| 6,625,435 | B1 * | 9/2003 | Ramesh .................... 455/313 |
| 6,711,396 | B1 * | 3/2004 | Bergsma et al. ............ 455/317 |
| 6,801,761 | B1 * | 10/2004 | Khorram ................... 455/326 |
| 2002/0160738 | A1 * | 10/2002 | Allott et al. ............... 455/304 |

* cited by examiner

*Primary Examiner*—Edward F. Urban
*Assistant Examiner*—Nhan T. Le
(74) *Attorney, Agent, or Firm*—Garlick Harrison & Markison; Timothy W. Markison

(57) ABSTRACT

A method for adjusting a programmable mixer of a local oscillation module to reduce local oscillation leakage begins by determining at least one of: DC offset of an input signal of the programmable mixer and process mismatches between a first mixing stage and a second mixing stage. The method continues by determining operational characteristics mismatch between the first mixing stage and the second mixing stage based on the at least one of the DC offset and process mismatches. The method continues by generating a control signal to substantially compensate for the operational characteristics mismatch. The method continues by providing the control signal to a compensation module, wherein the compensation module modifies operational characteristics of at least one of the first and second mixing stages based on the control signal such that the operational characteristics of the first mixing stage substantially equals the operational characteristics of the second mixing stage.

12 Claims, 7 Drawing Sheets programmable mixer 100 or 102

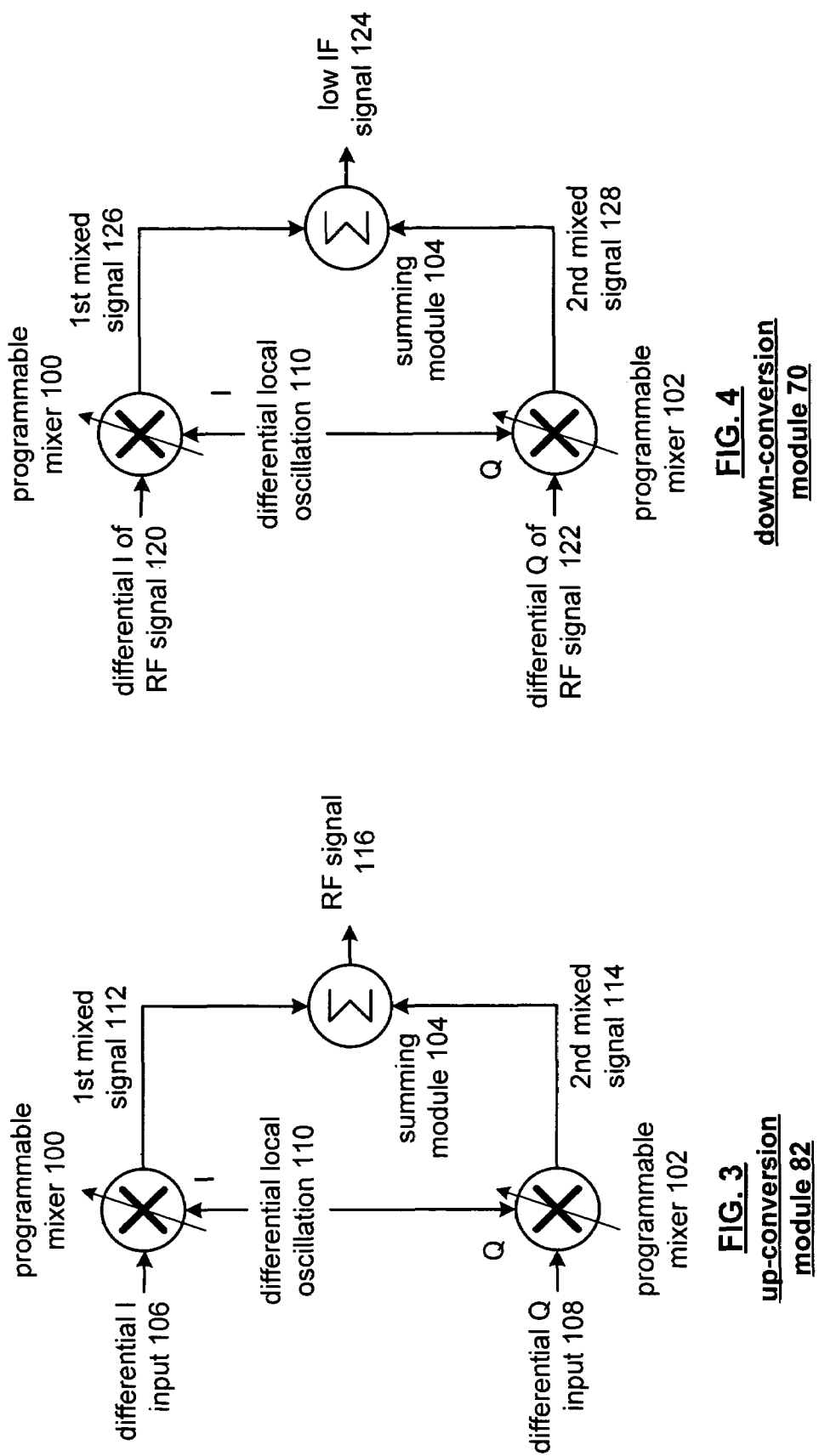

programmable mixer 100 or 102

ADJUSTING A PROGRAMMABLE MIXER

This patent application is claiming priority under 35 USC § 120 as a continuing patent application to patent application entitled PROGRAMMABLE MIXER AND RADIO APPLICATIONS THEREOF, having a Ser. No. of 10/077,571, and a filing date of Feb. 15, 2002 now U.S. Pat No. 6,801,761.

TECHNICAL FIELD OF THE INVENTION

This invention relates generally to communication systems and more particularly to radio transceivers used within such communication systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), wireless application protocols (WAP), local multi-point distribution systems (LMDS), multi-channel-multi-point distribution systems. (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel (e.g., one of the plurality of radio frequency (RF) carriers of the wireless communication system) and share information over that channel. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver receives RF signals, removes the RF carrier frequency from the RF signals via one or more intermediate frequency stages, and demodulates the signals in accordance with a particular wireless communication standard to recapture the transmitted data. The transmitter converts data into RF signals by modulating the data in accordance with the particular wireless communication standard and adds an RF carrier to the modulated data in one or more intermediate frequency stages to produce the RF signals.

As the demand for enhanced performance (e.g., reduced interference and/or noise, improved quality of service, compliance with multiple standards, increased broadband applications, et cetera), smaller sizes, lower power consumption, and reduced costs increases, wireless communication device engineers are faced with a very difficult design challenge to develop such a wireless communication device. Typically, an engineer is forced to compromise one or more of these demands to adequately meet the others. For instance, an engineer may choose a direct conversion topology (i.e., convert directly from an RF signal to a base-band signal or directly from a base-band signal to an RF signal) to meet size requirements and/or broadband application requirements. However, for direct conversion transceivers, noise and/or interference increases due to local oscillation leakage, non-linearities due to component mismatches and/or process variations are more detrimental to overall performance, and DC offsets, which result from a slight offset between the transmitting frequency of one wireless communication device and the frequency of the receiver in another wireless communication device, are more pronounced.

As is known, local oscillation leakage results from imperfections of the mixers within a transmitter that allow the local oscillation, which equals the RF, to be present in the resultant RF signal. The local oscillation leakage can be minimized by using multiple IF stages within the transmitter. In such an implementation, each IF stage uses a local oscillation that has a significantly different frequency than the RF, with the sum of the multiple local oscillations equals the RF. Since each local oscillation has a significantly different frequency than the RF, each local oscillation is outside the RF band of interest (i.e., the frequency spectrum of the resulting RF signal). But this requires an abandoning of the direct conversion topology and its benefits with respect to size reduction, power consumption reduction, reduced costs, and reduced complexity for broadband applications.

Costs of manufacturing a radio frequency integrated circuit (IC) may be reduced by switching from one integrated circuit manufacturing process to another. For example, a CMOS process may be used instead of a bi-CMOS process since it is a more cost affective method of IC manufacture, but the CMOS process increases component mismatches, increases temperature related variations, and increases process variations. As such, noise, local oscillator leakage, non-linearities and other factors that negatively impact an RF IC performance are increased for a CMOS process. Thus, in many RF IC applications, a designer chooses between cost savings and performance.

As is further known, many wireless communication standards provide for varying the transmitting power of the transmitter based on received signal strength of the wireless communication device receiving the transmission to conserve power. For instance, if the received RF signal is very strong, the receiver can easily recapture the embedded data. In such an instance, the transmission power level of the transmitter can be reduced and still provide a sufficiently strong RF signal to enable the receiver accurately recover the embedded data. Conversely, when the received signal is too weak, the receiver cannot accurately recover the embedded data, thus the transmission power level needs to be increased. Typically, the transmitter power is increased by increasing the gain of its power amplifier. The gain of the power amplifier is increased by changing the bias level of the input signal. While this increases the gain, the linearity of the power amplifier is adversely affected, which adversely affects the performance of the transmitter and the overall radio.

Therefore, a need exists for a low power, reduced size, reduced cost, and enhanced performance radio, radio transmitter, radio receiver, and/or components thereof.

SUMMARY OF THE INVENTION

These needs and others are substantially met by the adjusting of a programmable mixer disclosed herein. In one embodiment, a method for adjusting a programmable mixer of a local oscillation module to reduce local oscillation leakage begins by determining at least one of: DC offset of an input signal of the programmable mixer and process mismatches between a first mixing stage and a second mixing stage. The method continues by determining operational characteristics mismatch between the first mixing stage and the second mixing stage based on the at least one of the DC offset and process mismatches. The method continues by generating a control signal to substantially compensate for the operational characteristics mismatch. The method continues by providing the control signal to a compensation module, wherein the compensation module modifies operational characteristics of at least one of the first and second mixing stages based on the control signal such that the operational characteristics of the first mixing stage substantially equals the operational characteristics of the second mixing stage.

BRIEF DESCRIPTION OF THE DRAWINGS

FIG. 3 illustrates a schematic block diagram of an up-conversion module in accordance with the present invention;

FIG. 4 illustrates a schematic block diagram of a down-conversion module in accordance with the present invention;

DETAIL DESCRIPTION OF A PREFERRED EMBODIMENT

Figure 1:
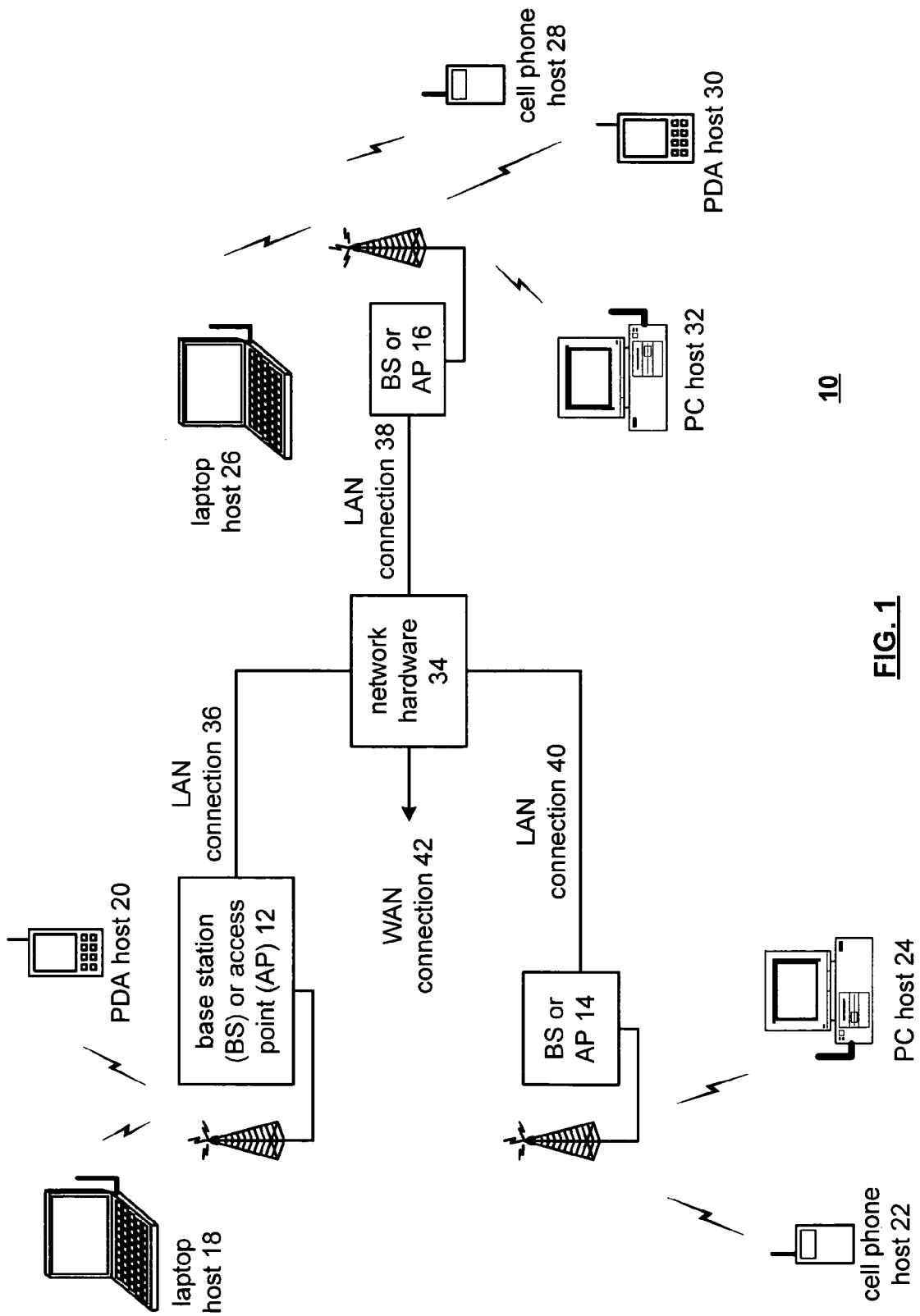
FIG. 1 illustrates a schematic block diagram of a wireless communication system that supports wireless communication devices in accordance with the present invention.

FIG. 1 illustrates a schematic block diagram of a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes an adjustable transmitter and/or receiver that include programmable mixers as disclosed herein to enhance performance, reduce costs, reduce size, and/or enhance broadband applications.

Figure 2:
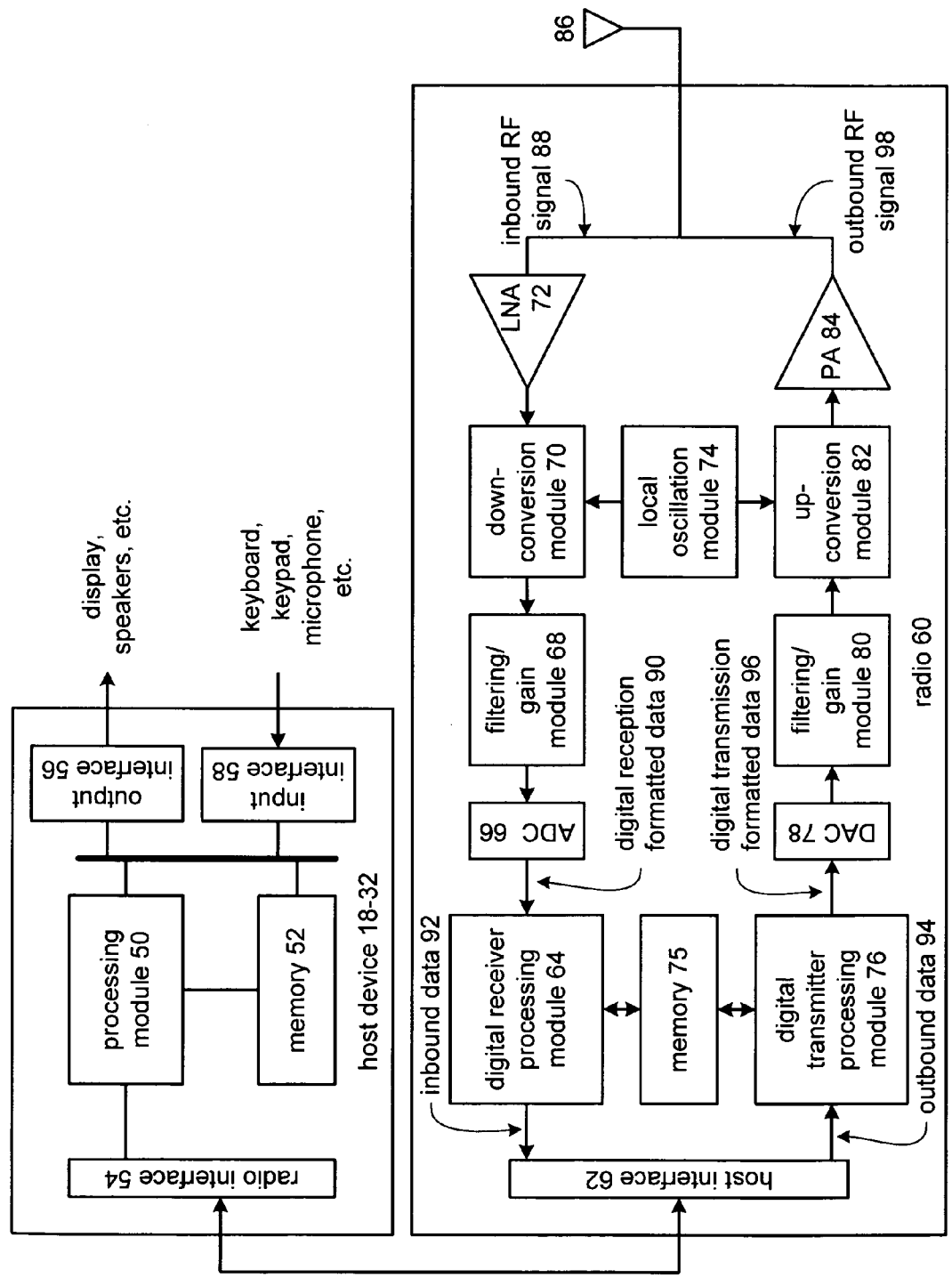
FIG. 2 illustrates a schematic block diagram of a wireless communication device in accordance with the present invention.

FIG. 2 illustrates a schematic block diagram of a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, analog-to-digital converter 66, filtering/gain module 68, down conversion module 70, low noise amplifier 72, local oscillation module 74, memory 75, digital transmitter processing module 76, digital-to-analog converter 78, filtering/gain module 80, up-conversion module 82, power amplifier 84, and an antenna 86. The antenna 86 may be a single antenna that is shared by the transmit and receive paths or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 and/or 76 executes, operational instructions corresponding to at least some of the functions illustrated in FIGS. 3–10.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82, which may include programmable mixers as disclosed herein, directly converts the analog baseband or low IF signal into an RF signal based on a transmitter local oscillation provided by local oscillation module 74. The power amplifier 84 amplifies the RF signal to produce outbound RF signal 98. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72, which amplifies the signal 88 to produce an amplified inbound RF signal. The low noise amplifier 72 provides the amplified inbound RF signal to the down conversion module 70, which may include programmable mixers as disclosed herein. The down conversion module 70 directly converts the amplified inbound RF signal into an inbound low IF signal based on a receiver local oscillation provided by local oscillation module 74. The down conversion module 70 provides the inbound low IF signal to the filtering/gain module 68, which filters and/or adjusts the gain of the signal before providing it to the analog to digital converter 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

FIG. 3 illustrates a schematic block diagram of an up-conversion module 82 that may be used in the transmit path of a wireless communication device. The up-conversion module 82 includes a $1^{st}$ programmable mixer 100, a $2^{nd}$ programmable mixer 102 and a summing module 104. The $1^{st}$ programmable mixer 100 mixes a differential I input signal 106 with a differential local oscillation 110 to produce a $1^{st}$ mixed signal 112. The $2^{nd}$ programmable mixer 102 is operably coupled to mix a differential Q input signal 108 with the differential local oscillation 110 to produce a $2^{nd}$ mixed signal 114. The differential I and Q signals 106 and 108 correspond to the analog in-phase and quadrature components representation of the digital transmission formatted data 96 after processing by digital-to-analog converter 78 and the filtering/gain module 80.

The summing module 104 sums the $1^{st}$ mixed signal 112 with the $2^{nd}$ mixed signal 114 to produce an RF signal 116. The RF signal 116 is provided to power amplifier 84 to produce outbound RF signal 98. The programmable mixer 100 and 102 will be described in greater detail with reference to FIGS. 5–10.

FIG. 4 illustrates a schematic block diagram of the down-conversion module 70 that includes the programmable mixer 100, programmable mixer 102 and summing module 104. In this embodiment, the programmable mixer 100 mixes the differential I component of an RF signal 120 with the differential local oscillation 110 to produce a $1^{st}$ mixed signal 126. The $2^{nd}$ programmable mixer 102 mixes a differential Q component of the RF signal 120 with the differential local oscillation 110 to produce a $2^{nd}$ mixed signal 128.

The summing module 104 sums the $1^{st}$ mixed signal 126 with the $2^{nd}$ mixed signal 128 to produce a low IF signal 124. Note that the output of summing module 104 would be band-pass filtered or low-pass filtered to produce the low IF signal 124. In an alternate embodiment of down-conversion module 70, the summing module 104 would be omitted and the $1^{st}$ and $2^{nd}$ mixing signals 126 and 128 would be provided to a polyphase filter which would produce the low IF signal 124.

Figure 5:
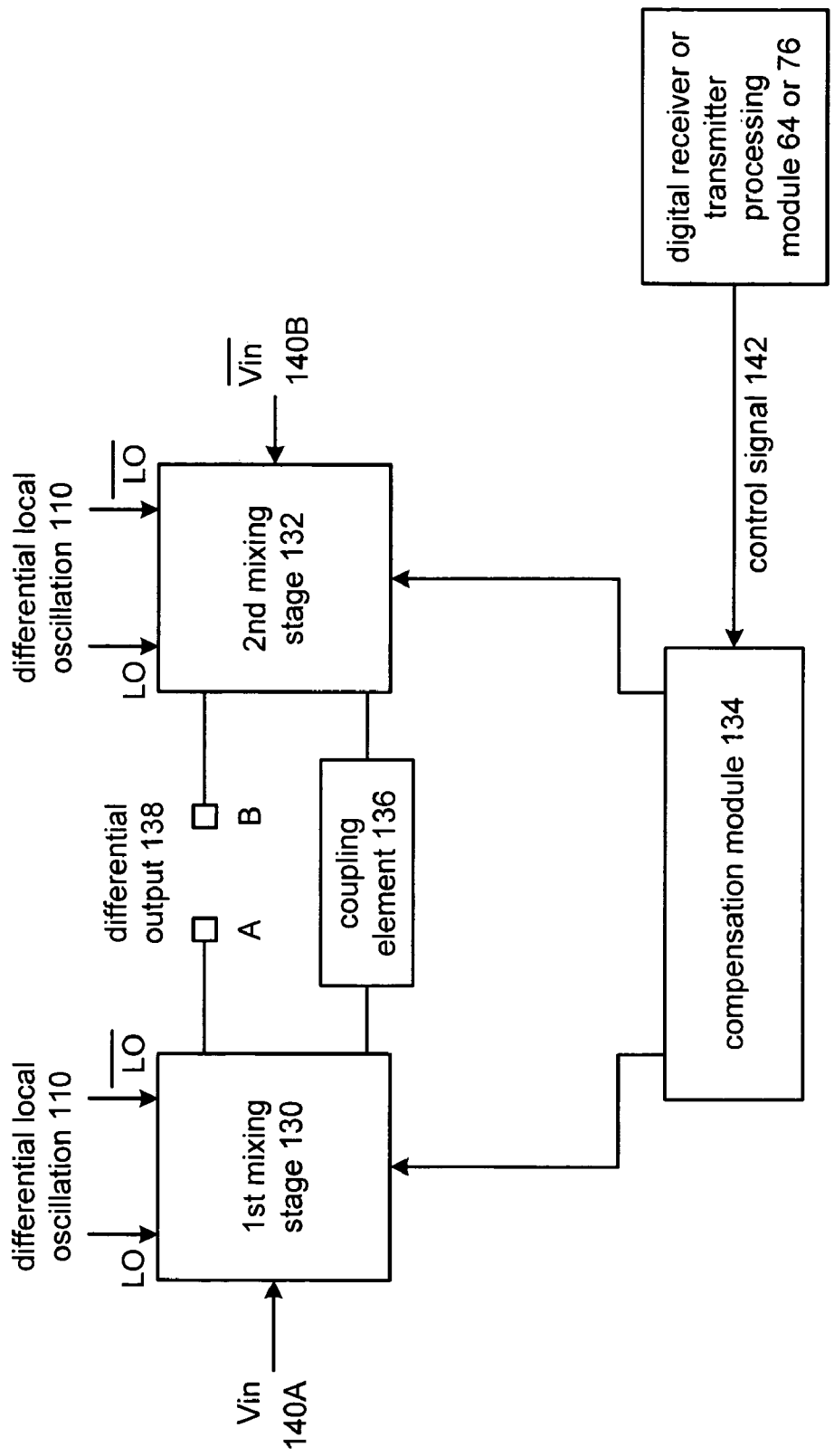
FIG. 5 illustrates a schematic block diagram of a programmable mixer in accordance with the present invention.

FIG. 5 illustrates a schematic block diagram of programmable mixer 100 or 102. The programmable mixer includes a $1^{st}$ mixing stage 130, a $2^{nd}$ mixing stage 132, compensation module 134 and coupling element 136. The $1^{st}$ mixing stage 130 is operably coupled to mix one leg of a differential input signal 140A (which may be one leg of the I or Q component of signals 106, 108, 112 or 122) with the differential local oscillation 110 (LO and LO-bar). The mixing performed by the $1^{st}$ mixing stage 130 may be altered based on compensation provided by compensation module 134.

The $2^{nd}$ mixing stage 132 is operably coupled to mix the other leg of a differential input 140B with the differential local oscillation 110. The mixing performed by the $2^{nd}$ mixing stage 132 may be altered by compensation module 134.

The $1^{st}$ and $2^{nd}$ mixing stages 130 and 132 are operably coupled together via coupling element 136, which may be a resistor and/or inductor. The $1^{st}$ mixing stage 130 as configured, produces a $1^{st}$ leg of differential output 138 and the $2^{nd}$ mixing stage 132 produces the other leg of differential output 138.

The compensation module 134 is operably coupled to receive a control signal 142 from the digital receiver and/or digital transmitter processing module 64 and/or 76. The compensation module 134, based on control signal 142, compensates the operational characteristics of the $1^{st}$ mixing stage 130 and/or the $2^{nd}$ mixing stage 132 such that the operational characteristics of the $1^{st}$ mixing stage 130 more closely matches the operational characteristics of the $2^{nd}$ mixing stage 132. For example, the compensation module 132 may affect the gain of the $1^{st}$ mixing stage and/or $2^{nd}$ mixing stage, the impedance of the $1^{st}$ mixing stage and/or $2^{nd}$ mixing stage, the current flowing through the $1^{st}$ mixing stage and/or $2^{nd}$ mixing stage, et cetera.

Figure 6:
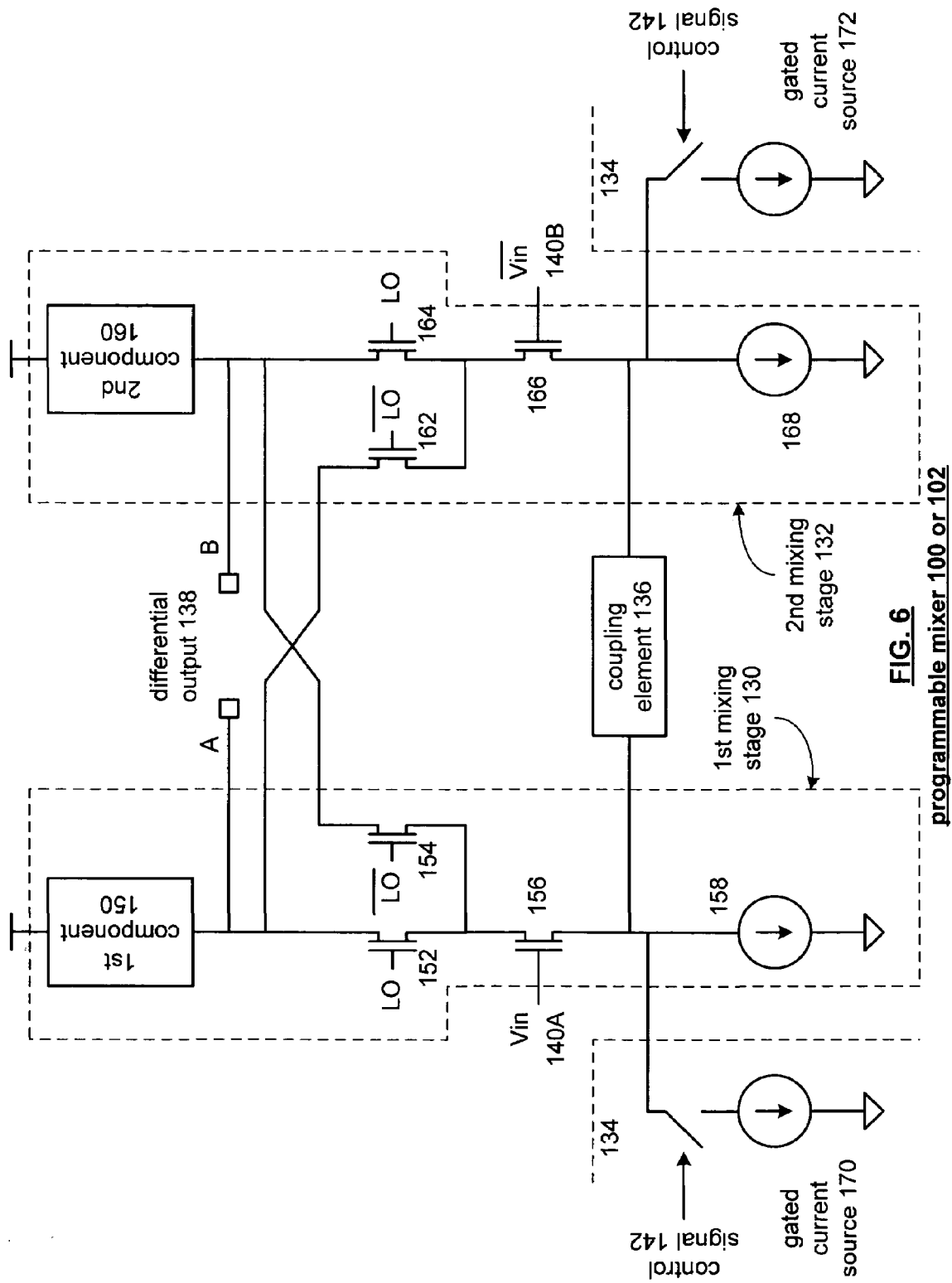
FIG. 6 illustrates a schematic block diagram of an alternate programmable mixer in accordance with the present invention.

FIG. 6 illustrates a more detailed schematic block diagram of an embodiment of programmable mixer 100 or 102. As shown, the $1^{st}$ mixing stage 130 includes a $1^{st}$ component 150, which may be a resistor or inductor, a pair of local oscillation transistors 152 and 154, an input transistor 156 and a current source 158. The $2^{nd}$ mixing stage 132 includes a $2^{nd}$ component 160, which may be a resistor or inductor, a pair of local oscillation transistors 162 and 164, an input transistor 166 and a current source 168.

With the compensation module 134 disabled, the $1^{st}$ and $2^{nd}$ mixing stages 130 and 132 mix a differential input signal 140A and B with the differential local oscillation 110 (LO and LO_) to produce differential output 138.

The compensation module 134 is illustrated to include a gated current source 170 coupled in parallel with current source 158 of the $1^{st}$ mixing stage 130 and a $2^{nd}$ gated source 172 coupled in parallel with current source 168 of the $2^{nd}$ mixing stage 132. Based on control signal 142, the compensation module 134 will enable gated current source 170, and/or gated current source 172. As such, when gated current source 170 is enabled, current through the input transistor 156 is increased by the ratio of current through current source 158 and current through current source 170. Similarly, the current through input transistor 166 of the $2^{nd}$ mixing stage 132 may be increased when the gated current source 172 is enabled. As such, by enabling gated current source 170 or gated current source 172, the current through the $1^{st}$ mixing stage 130 or the $2^{nd}$ mixing stage 132 may be increased to more closely match the current through the other mixing stage. For example, if the current through the input transistor 166 is determined to be greater than the current through transistor 156 of the $1^{st}$ mixing stage, the control signal 142 would enable gated current source 170 to be enabled. With gated current source 170 enabled, the current through input transistor 156 is increased thereby allowing it to more closely match the current through transistor 166. By more closely matching the currents through the $1^{st}$ mixing stage and $2^{nd}$ mixing stage, imbalances within the mixer are reduced. By reducing imbalances within the mixer, local oscillation leakage of a transmitter is reduced.

Figure 7:
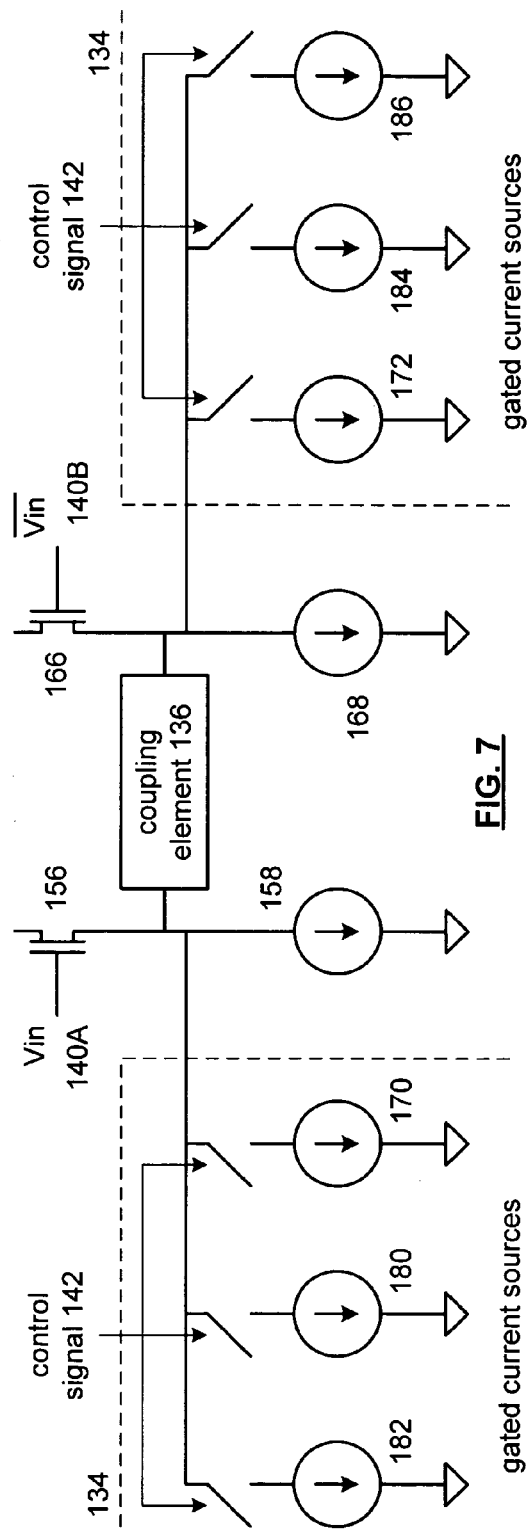
FIG. 7 illustrates a schematic block diagram of a programmable mixer including an alternate embodiment of the compensation module in accordance with the present invention.

FIG. 7 illustrates a schematic block diagram of an alternate embodiment of the compensation module 134. In this embodiment, the compensation module 134 includes a $1^{st}$ plurality of gated current sources coupled to current source 158 of the $1^{st}$ mixing stage and a $2^{nd}$ plurality of gated current sources coupled to the current source 168 of the $2^{nd}$ mixing stage. In this embodiment, any one of the gated current sources 170, 180 and 182 may be individually enabled to more finely adjust the current through input transistor 156. Similarly, any one of the plurality of gated current sources 172, 184 and 186 may be individually activated to more finely tune the current through transistor 166. As one of average skill in the art will appreciate, any number of gated current sources may be added within the compensation module 134 and enabled in any combination to finely tune the current through transistor 156 and/or through transistor 166.

Figure 8:
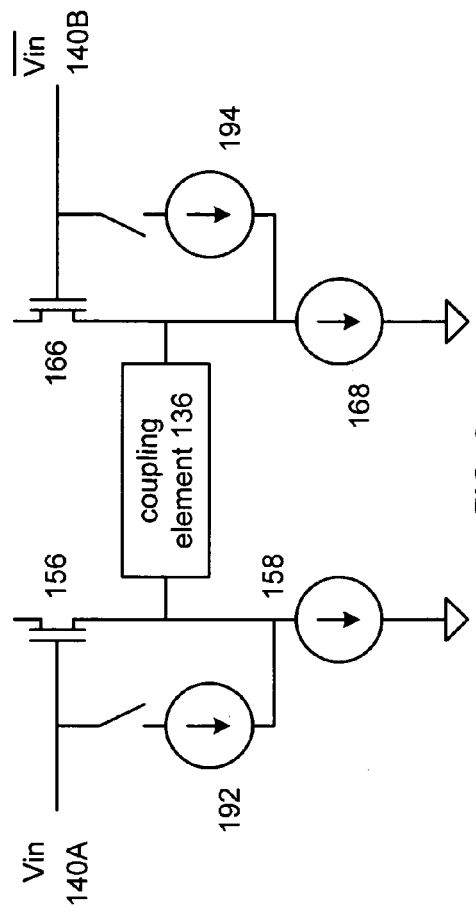
FIG. 8 illustrates a schematic block diagram of a programmable mixer having another alternate embodiment of the compensation module in accordance with the present invention.

FIG. 8 illustrates a schematic block diagram of another embodiment of the compensation module 134. In this embodiment, gated current sources 192 and 194 of the compensation module 134 are coupled to subtract current from input transistors 156 or 166.

When gated current source 192 is activated, the current through transistor 156 is reduced by the ratio of current source 192 with respect to current through current source 158. Similarly, the current through transistor 166 is reduced when the gated current source 194 is activated. As one of average skill in the art will appreciate, the compensation module embodiment of FIG. 8 may be implemented in combination with the embodiments illustrated in FIG. 6 and/or 7.

Figure 9:
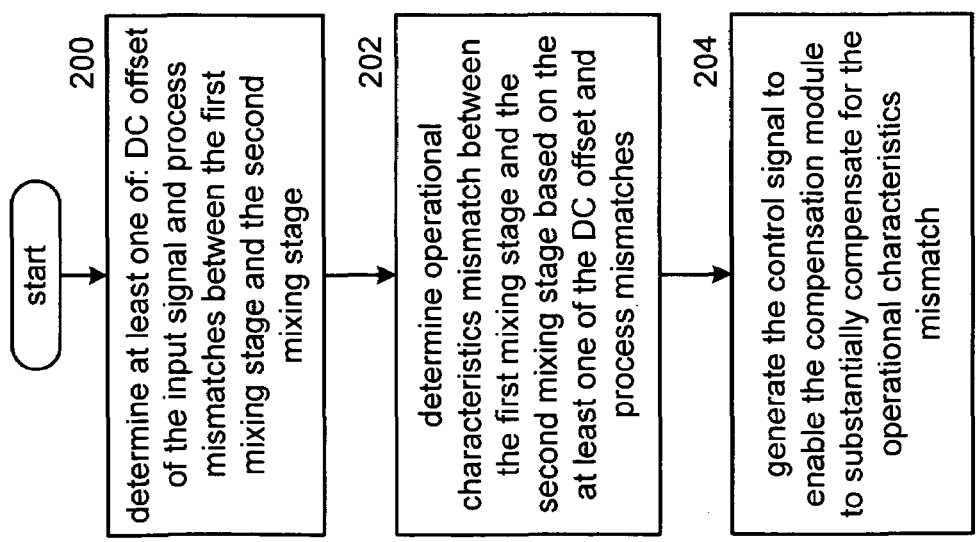
FIG. 9 illustrates a logic diagram of a method for determining the control signal that adjusts the compensation module in accordance with the present invention.

FIG. 9 illustrates a logic diagram for the processing module 64 or 76 to determine the control signal that adjusts the compensation module 134. Note that processing module 64 and 76 may be separate processing devices, a shared processing device, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 or 75 executes, operational instructions corresponding to at least some of the steps in FIGS. 9 and 10.

As shown in FIG. 9, the processing begins at Step 200 where the processing module determines DC offset of the input signal and/or process mismatches between the $1^{st}$ mixing stage and the $2^{nd}$ mixing stage. The process then proceeds to Step 202 where the processing module determines operational characteristic mismatches between the $1^{st}$ mixing stage and the $2^{nd}$ mixing stage based on the DC offset and/or process mismatches. For example, the processing module may determine the current imbalances between the $1^{st}$ mixing stage and the $2^{nd}$ mixing stage.

The process then proceeds to Step 204 where the processing module generates a control signal to enable the compensation module to substantially compensate for the operational characteristic mismatches. For example, the control signal may indicate that one of the current sources within the compensation module is to be enabled thereby compensating for current of the respective mixing stage.

Figure 10:
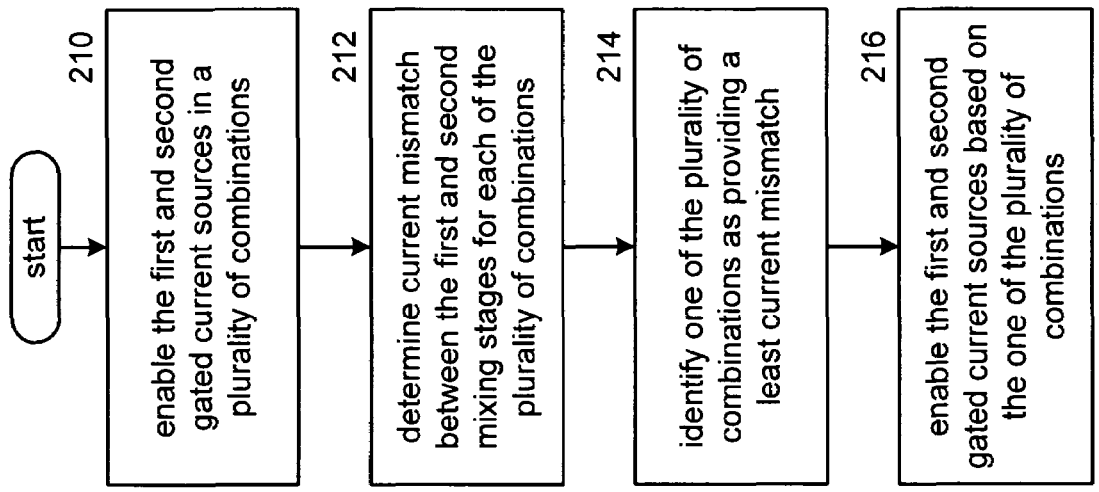
FIG. 10 illustrates a logic diagram of an alternate method for determining the control signal that adjusts the compensation module in accordance with the present invention.

FIG. 10 illustrates a logic diagram of an alternate method for determining the control signal, which may be performed by processing module 64 and/or 76. The process begins at Step 210 where the processing module enables the $1^{st}$ and $2^{nd}$ gated current sources in a plurality of combinations. The processing then proceeds to Step 212 where the processing module determines current mismatches between the $1^{st}$ and $2^{nd}$ mixing stages for each of the plurality of combinations. The process then proceeds to Step 214 where the processing module identifies one of the plurality of combinations as providing the least current mismatch (i.e., a best match situation). The process then proceeds to Step 216 where the processing module enables the $1^{st}$ and $2^{nd}$ gated current sources based on one of the plurality of combinations.

For example, in the embodiment illustrated in FIG. 7, the processing module would sequentially enable the gated current sources in a variety of combinations and correspondingly measure the current through transistors 156 and 166. The combination of gated current sources that provide the closest match of currents through transistor 156 and 166 would be used for the programmable mixer.

The preceding discussion has presented a programmable mixer that may be used in a radio transmitter and/or radio receiver. By programming the mixer to compensate for process mismatches, temperature variations, and/or DC offsets, local oscillation leakage can be reduced within transmitter sections. As one of average skill in the art will appreciate, other embodiments may be derived from the teaching of the present invention, without deviating from the scope of the claims.

What is claimed is:

1. A method for adjusting a programmable mixer of a local oscillation module to reduce local oscillation leakage, the method comprises:
   determining at least one of: DC offset of an input signal of the programmable mixer and process mismatches between a first mixing stage and a second mixing stage;
   determining operational characteristics mismatch between the first mixing stage and the second mixing stage based on the at least one of the DC offset and process mismatches;
   generating a control signal to substantially compensate for the operational characteristics mismatch; and
   providing the control signal to a compensation module, wherein the compensation module modifies operational characteristics of at least one of the first and second mixing stages based on the control signal such that the operational characteristics of the first mixing stage substantially equals the operational characteristics of the second mixing stage.

2. The method of claim 1 further comprises:
   mixing, via the first mixing stage, a first leg of the input signal with a differential local oscillation in accordance with the operational characteristics of the first mixing stage substantially equals the operational characteristics of the second mixing stage; and
   mixing, via the second mixing stage, a second leg of the input signal with the differential local oscillation in accordance with the operational characteristics of the first mixing stage substantially equals the operational characteristics of the second mixing stage.

3. The method of claim 1, wherein the compensation module further functions to modify the operational characteristics of the at least one of the first and second mixing stages by at least one of:
   increasing current through the first mixing stage; and
   increasing current through the second mixing stage.

4. The method of claim 3 further comprises:
   enabling a first gated current source of the first mixing stage and a second gated current source of the second mixing stage in a plurality of combinations;
   determining current mismatch between the first and second mixing stages for each of the plurality of combinations;
   identifying one of the plurality of combinations as providing a least current mismatch; and
   enabling the first and second gated current sources based on the one of the plurality of combinations.

5. The method of claim 4, wherein the enabling the first and second gated current sources further comprises at least one of:
   enabling at least one of a first plurality of gated current sources of the first mixing stage; and
   enabling at least one of a second plurality of gated current sources of the second mixing stage.

6. The method of claim 1, wherein the compensation module further functions to modify the operational characteristics of the at least one of the first and second mixing stages by at least one of:
   enabling a first gated current source operably coupled between a gate and a source of a first input transistor of the first mixing stage; and
   enabling a second gated current source operably coupled between a gate and a source of a second input transistor of the second mixing stage.

7. An apparatus for adjusting a programmable mixer of a local oscillation module to reduce local oscillation leakage, the apparatus comprises:
   a processing module; and
   memory operably coupled to the processing module, wherein the memory stores operational instructions that cause the processing module to:
   determine at least one of: DC offset of an input signal of the programmable mixer and process mismatches between a first mixing stage and a second mixing stage;
   determine operational characteristics mismatch between the first mixing stage and the second mixing stage based on the at least one of the DC offset and process mismatches;
   generate a control signal to substantially compensate for the operational characteristics mismatch; and
   provide the control signal to a compensation module, wherein the compensation module modifies operational characteristics of at least one of the first and second mixing stages based on the control signal such that the operational characteristics of the first mixing stage substantially equals the operational characteristics of the second mixing stage.

8. The apparatus of claim 7, wherein the memory further stores operational instructions that cause the processing module to:
enable mixing, via the first mixing stage, a first leg of the input signal with a differential local oscillation in accordance with the operational characteristics of the first mixing stage substantially equals the operational characteristics of the second mixing stage; and
enable mixing, via the second mixing stage, a second leg of the input signal with the differential local oscillation in accordance with the operational characteristics of the first mixing stage substantially equals the operational characteristics of the second mixing stage.

9. The apparatus of claim 7, wherein the memory further stores operational instructions that cause the processing module to modify the operational characteristics of the at least one of the first and second mixing stages by at least one of:
increasing current through the first mixing stage; and
increasing current through the second mixing stage.

10. The apparatus of claim 9, wherein the memory further stores operational instructions that cause the processing module to:
enable a first gated current source of the first mixing stage and a second gated current source of the second mixing stage in a plurality of combinations;
determine current mismatch between the first and second mixing stages for each of the plurality of combinations;
identify one of the plurality of combinations as providing a least current mismatch; and
enable the first and second gated current sources based on the one of the plurality of combinations.

11. The apparatus of claim 10, wherein the memory further stores operational instructions that cause the processing module to enable the first and second gated current sources by at least one of:
enabling at least one of a first plurality of gated current sources of the first mixing stage; and
enabling at least one of a second plurality of gated current sources of the second mixing stage.

12. The apparatus of claim 7, wherein the memory further stores operational instructions that cause the processing module to modify the operational characteristics of the at least one of the first and second mixing stages by at least one of:
enabling a first gated current source operably coupled between a gate and a source of a first input transistor of the first mixing stage; and
enabling a second gated current source operably coupled between a gate and a source of a second input transistor of the second mixing stage.

* * * * *